United States Patent [19]
Becker et al.

[11] Patent Number: 4,888,485
[45] Date of Patent: Dec. 19, 1989

[54] BETA/ALPHA CONTINUOUS AIR MONITOR

[75] Inventors: Gregory K. Becker, Idaho Falls, Id.; Dowell E. Martz, Grand Junction, Colo.

[73] Assignee: The United States Department of Energy, Washington, D.C.

[21] Appl. No.: 211,647

[22] Filed: Jun. 27, 1988

[51] Int. Cl.⁴ .............................................. G01T 1/24
[52] U.S. Cl. ............................... 250/370.06; 250/253; 250/370.02
[58] Field of Search ............. 250/370.06, 370.02, 250/370.01, 395, 253

[56] References Cited

U.S. PATENT DOCUMENTS

| | | | |
|---|---|---|---|
| 3,914,602 | 10/1975 | Goldstein | 250/253 |
| 4,078,178 | 3/1978 | Lowes | 250/336.1 |
| 4,262,203 | 4/1981 | Overhoff | 250/374 |
| 4,295,045 | 10/1981 | Minami | 250/255 |
| 4,400,621 | 8/1983 | Kiefer et al. | 250/385.1 |
| 4,700,067 | 10/1987 | Carossi et al. | 250/380 |

OTHER PUBLICATIONS

J. Bigu and R. Raz, "Passive Radon/Thoron personal Dosimeter Using an Electrostatic Collector and a Diffused-Junction Detector," *Review of Scientific Instruments*, vol. 56, No. 1, (Jan. 1985), pp. 146-152 [©1985 American Institute of Physics].

*Primary Examiner*—Constantine Hannaher
*Attorney, Agent, or Firm*—Helen S. Cordell; John M. Albrecht; William R. Moser

[57] ABSTRACT

A single deep layer silicon detector in combination with a microcomputer, recording both alpha and beta activity and the energy of each pulse, distinguishing energy peaks using a novel curve fitting technique to reduce the natural alpha counts in the energy region where plutonium and other transuranic alpha emitters are present, and using a novel algorithm to strip out radon daughter contribution to actual beta counts.

11 Claims, 8 Drawing Sheets

BETA/ALPHA CONTINUOUS AIR MONITOR

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates to a method and apparatus for the detection and monitoring of beta and alpha particles, and in particular to the use of a single deep layer silicon detector in combination with a microcomputer to monitor air quality by measuring and discriminating among the energy levels of air-borne radioactive particles.

Air pollution due to plutonium dust is extremely harmful to the human body. However, slight deviations above the legally permissable concentrations are difficult to detect because of the presence of daughter nuclides of natural radon and thoron isotopes. Plutonium emits alpha particles with an energy level of 5.3 meV while the daughter nuclides emit alpha particles with energy levels of 6.0 meV and 7.68 meV, but instruments using this basis for differentiation must allow for the fact that concentrations of radon and thoron daughters vary widely depending upon atmospheric as well as ground conditions.

The problem is complicated when there is need as well to detect the presence of beta emitting fission products. In a standard proportional type ionization counter, alpha particles may lose their energy and generate an electrical response from the detector as beta particles. The 'straggled' alpha pulses become virtually indistinguishable from the beta pulses.

Proportional counters which operate with two energy channels are common. The higher energy alpha particles will be recorded at one voltage, while both alpha and the lower energy particles will be recorded at another voltage. Except for alpha straggling, the difference between the two will be a measure of beta activity.

Similarly, in a plutonium background compensating monitor, one channel will measure the higher energy alpha particles emitted by radon daughters, and another channel will measure the lower energy of alpha particles emitted by plutonium. An attempt is made to eliminate false measurement due to straggling by substracting a fraction of the higher energy pulse from the plutonium count.

Multichannel analyzers which record the true energy spectrum of both alpha and beta particles are often complicated and expensive. Differentiation of background and straggling counts requires the imposition on data of average counting rates arrived at experimentally, or curve fitting based on assumptions of normal distribution. By design, these instruments often neglect the need for instantaneous response in favor of accuracy by cumulative measurement, or, conversely, sound alarms repeatedly without reporting or analyzing minor deviations from a cumulative pattern.

No single instrument of the prior art efficiently combines the functions of measuring beta and alpha activity, as well as distinguishing beta and alpha activity from ambient background noise.

It is an object of this invention to provide an improved air monitor to record both alpha and beta activities and the energy of each pulse.

It is another object of this invention to provide an improved air monitor which rapidly distinguishes energy peaks due to alpha activity from natural radon and thoron daughters.

It is a further object of this invention to provide an improved air monitor to record natural beta activity present and discriminate in favor of beta emitting contaminants.

It is another object of this invention to provide an improved air monitor which operates remotely and automatically, recording both instantaneous and long-term radiation activity.

Additional objects, advantages and novel features of the invention will become apparent to those skilled in the art upon examination of the following and by practice of the invention.

SUMMARY OF THE INVENTION

To achieve the foregoing and other objects, this invention comprises a single deep layer silicon detector in combination with a microcomputer, recording both alpha and beta activity and the energy of each pulse, distinguishing energy peaks using a novel curve fitting technique to reduce the natural alpha counts in the energy region where plutonium and other transuranic alpha emitters are present, and using a novel algorithm to strip out radon daughter contribution to actual beta counts.

BRIEF DESCRIPTION OF THE DRAWINGS

The present invention is depicted in the accompanying drawings, graphs and computer program. The problems addressed by the invention are illustrated by graphically displaying the energy levels of the particles to be distinguished. The apparatus and method of the invention are described in detail.

FIG. 9a through 9j depict exemplary computer listing showing the manner in which the invention was implemented.

DETAILED DESCRIPTION OF THE INVENTION

The first several figures depict the energy spectra of the radon daughter background and some plutonium spectra, to illustrate the improved monitor's discrimination capabilities.

Figure 1:
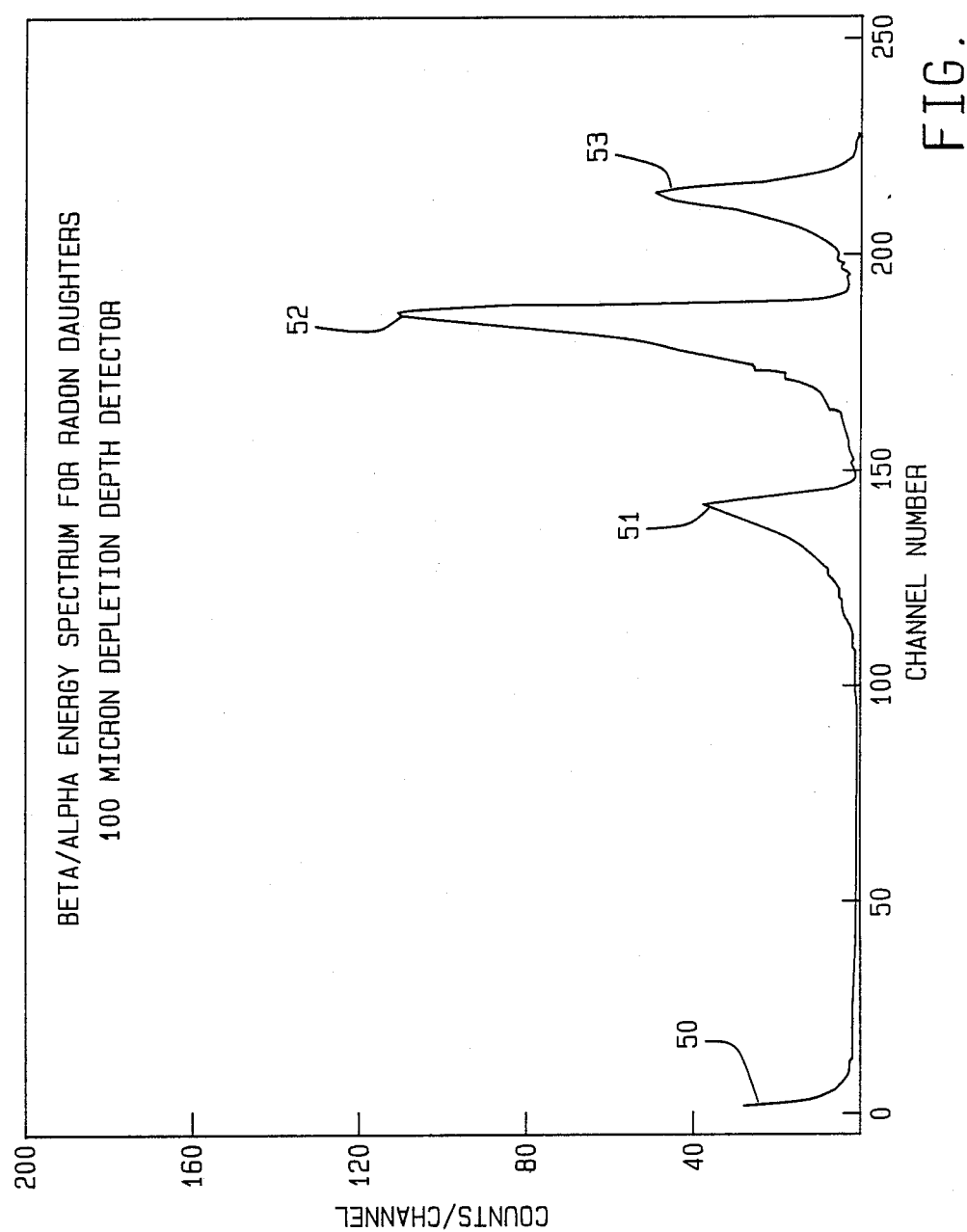
FIG. 1 is a typical alpha energy spectrum of radon/thoron daughters.

FIG. 1 is a typical radon and thoron daughter alpha energy spectrum collected from a membrane filter with a 3 mm air path. In this case, the detector was a 100 micron depletion depth detector common in the prior art. The spectrum using this detector shows very little beta response 50—beta response 50 if any being recorded in the first few channel numbers. The first alpha peak 51 is the Po-218 (RaA), first daughter of Rn-222 at 6.00 meV. The second alpha peak 52 is due to Po-214 (RaC') at 7.68 meV. The third alpha peak 53 is due to Po-211 (ThC') from the thoron decay chain at 8.78 meV. This spectrum represents the equilibrium situation after more than 24 hours of sampling. Ordinarily, the ThC' peak 53 would not be observed in sampling times of less than an hour, since there is a 10.6 hour intermediate half-life involved. There is another thoron daughter alpha that is hidden under the RaA peak for long sampling times.

Figure 2:
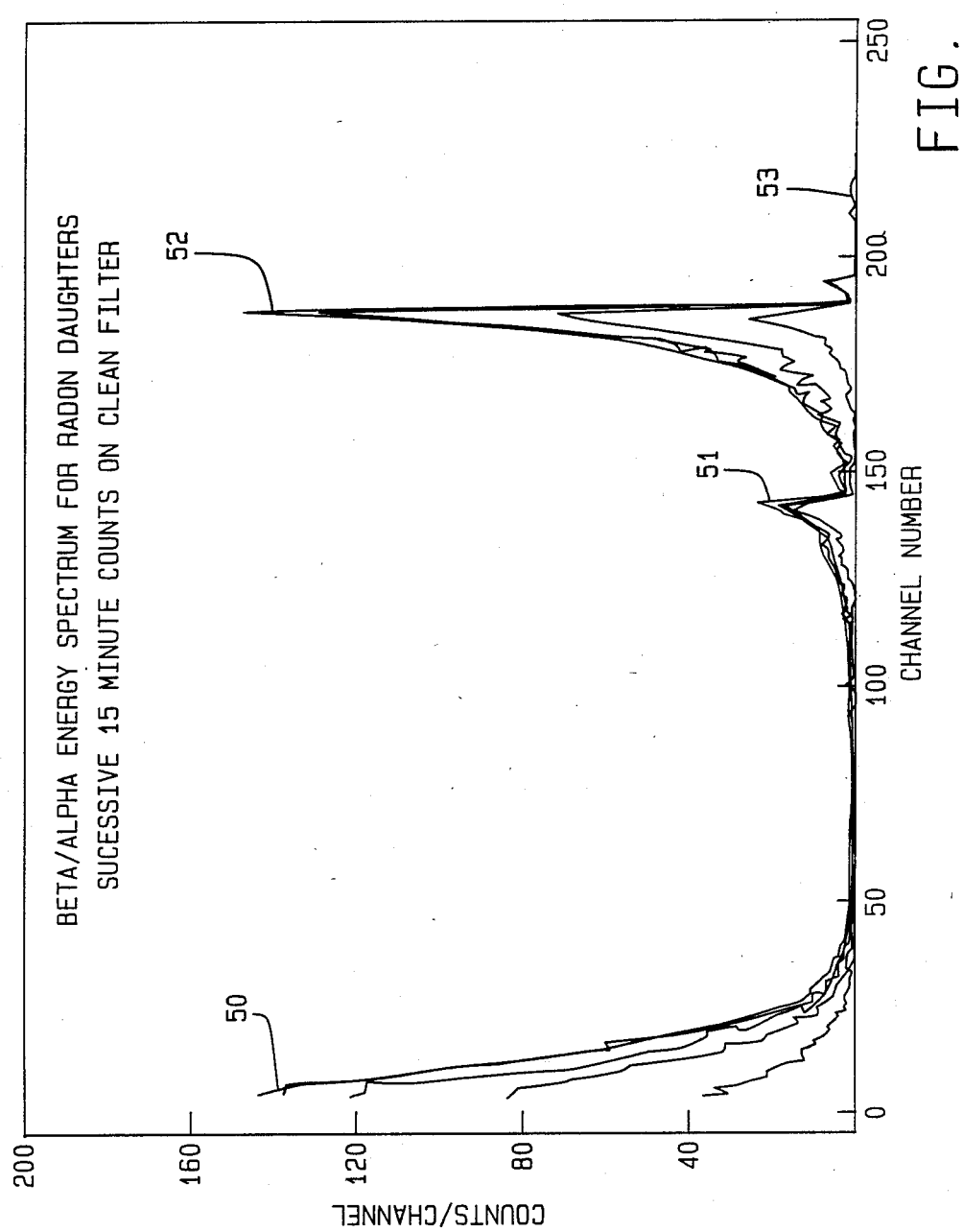
FIG. 2 is a beta/alpha energy spectrum of radon/thoron daughters in successive 15 minute counts.

FIG. 2 shows a similar energy spectrum using a 1000 micron depletion depth detector, with four successive 15 minute counts starting with a clean filter. Note the beta response 50 at low channel numbers and the build-up toward equilibrium. The RaA peak 51 is almost at equilibrium in the first 15 minute count because the half-life is only 3.05 minutes. It takes nearly an hour of sampling for the RaC' peak 52 and the betas 50 to reach equilibrium. There are few of the ThC' counts 53 above channel 200 because several hours are required to collect enough of the thoron daughter activity.

Figure 3:
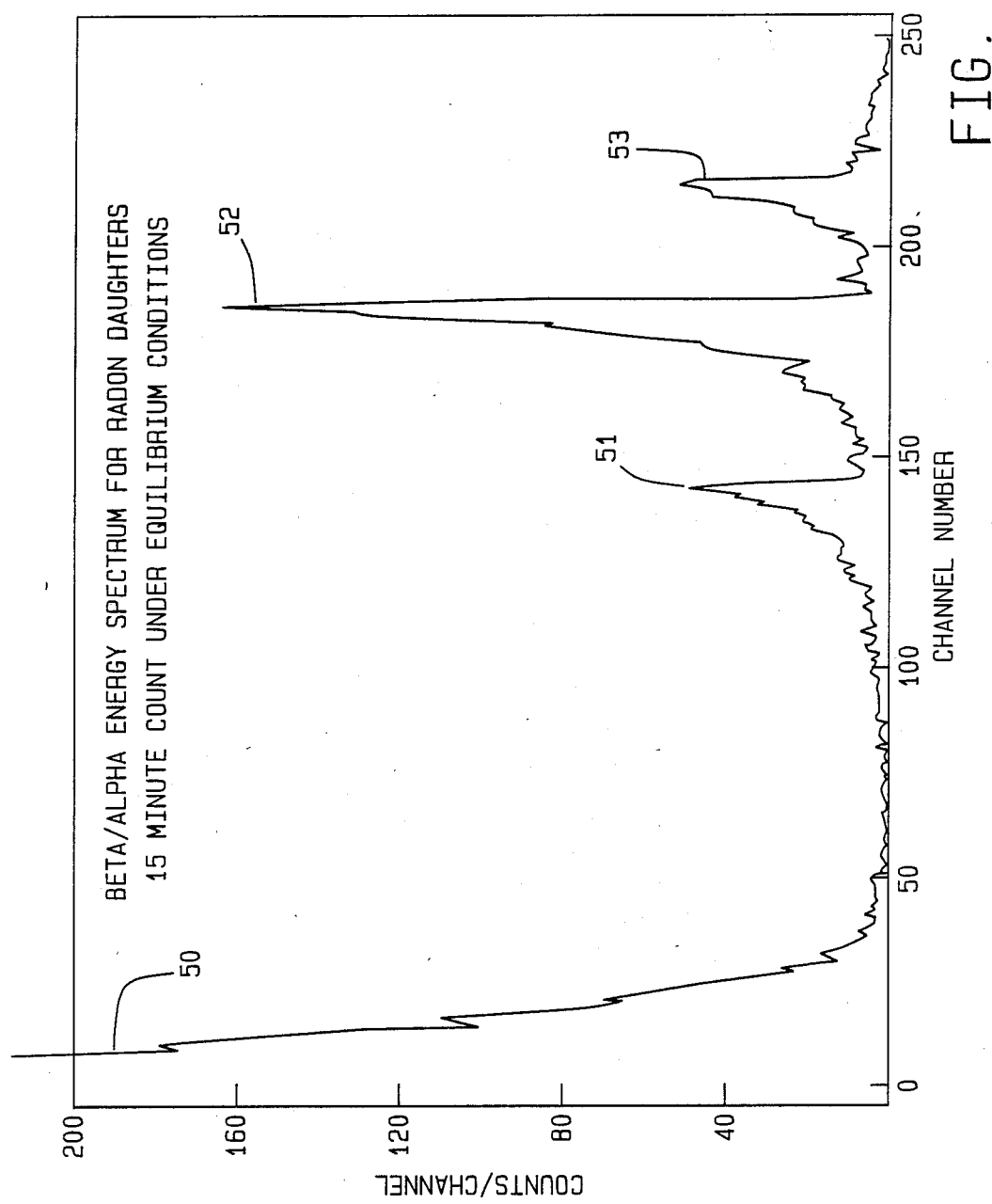
FIG. 3 is a beta/alpha energy spectrum of radon/thoron daughters under equilibrium conditions.

FIG. 3 depicts the activity after 24 hours of sampling, with the ThC' peak 53 now close to equilibrium. Note in particular, the "straggling" of the RaA alpha peak 51 below approximately channel 125; this is where the plutonium peak occurs.

Figure 4:
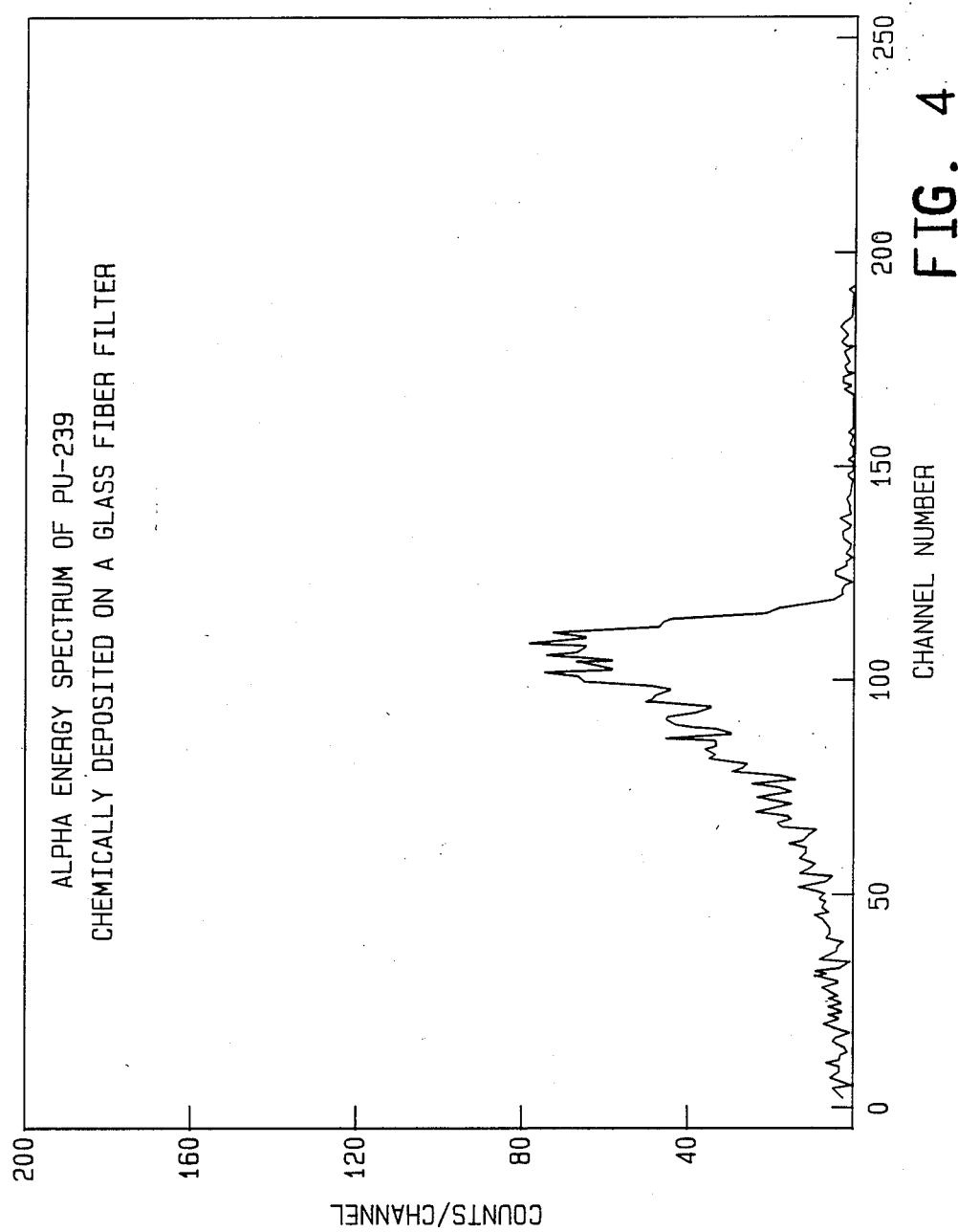
FIG. 4 is the alpha energy spectrum of Pu-239 on a glass fiber filter.

FIG. 4 is a plot of the alpha energy spectrum of Pu-239 using the same energy scale. The source is plutonium oxide chemically deposited on a glass fiber filter. The subject invention uses membrane filters rather than glass fiber filters. However, this source accurately simulates the straggling one would observe from plutonium mixed with dust on a membrane filter. The upper energy edge 54 appears at approximately channel 123. Most of the plutonium counts are above channel 80.

Figure 5:
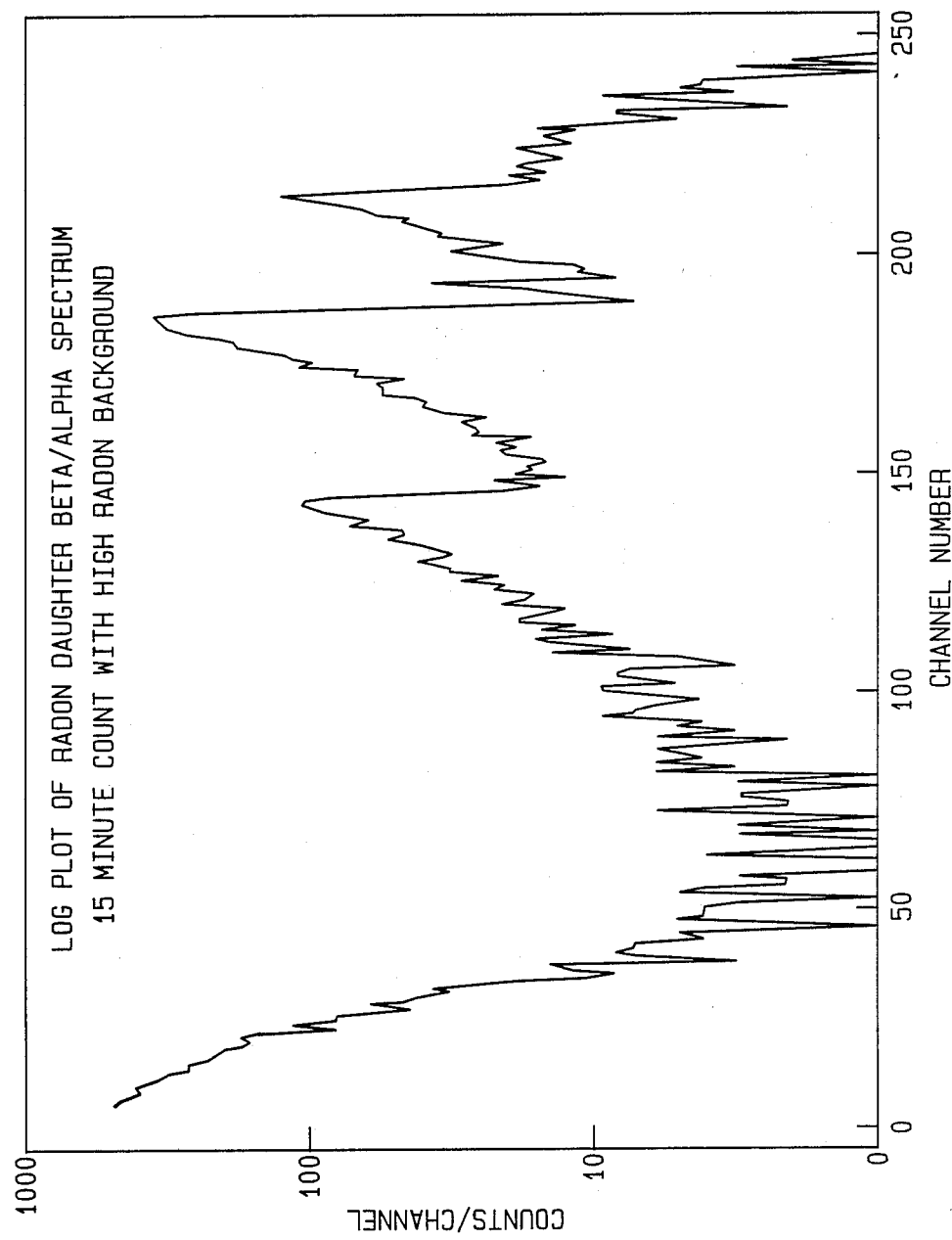
FIG. 5 is a logrithmic plot of a radon/thoron daughter energy spectrum with a high radon background.

FIG. 5 is another plot of the radon daughter energy spectrum on the same horizontal scale, but the vertical scale is a logrithmic plot. This is a very high radon daughter background. This illustrates one problem which the subject invention addresses—detecting a few counts due to Pu-239 around channels 80-125 completely hidden by the straggling from the RaA alpha peak 51.

Figure 6:
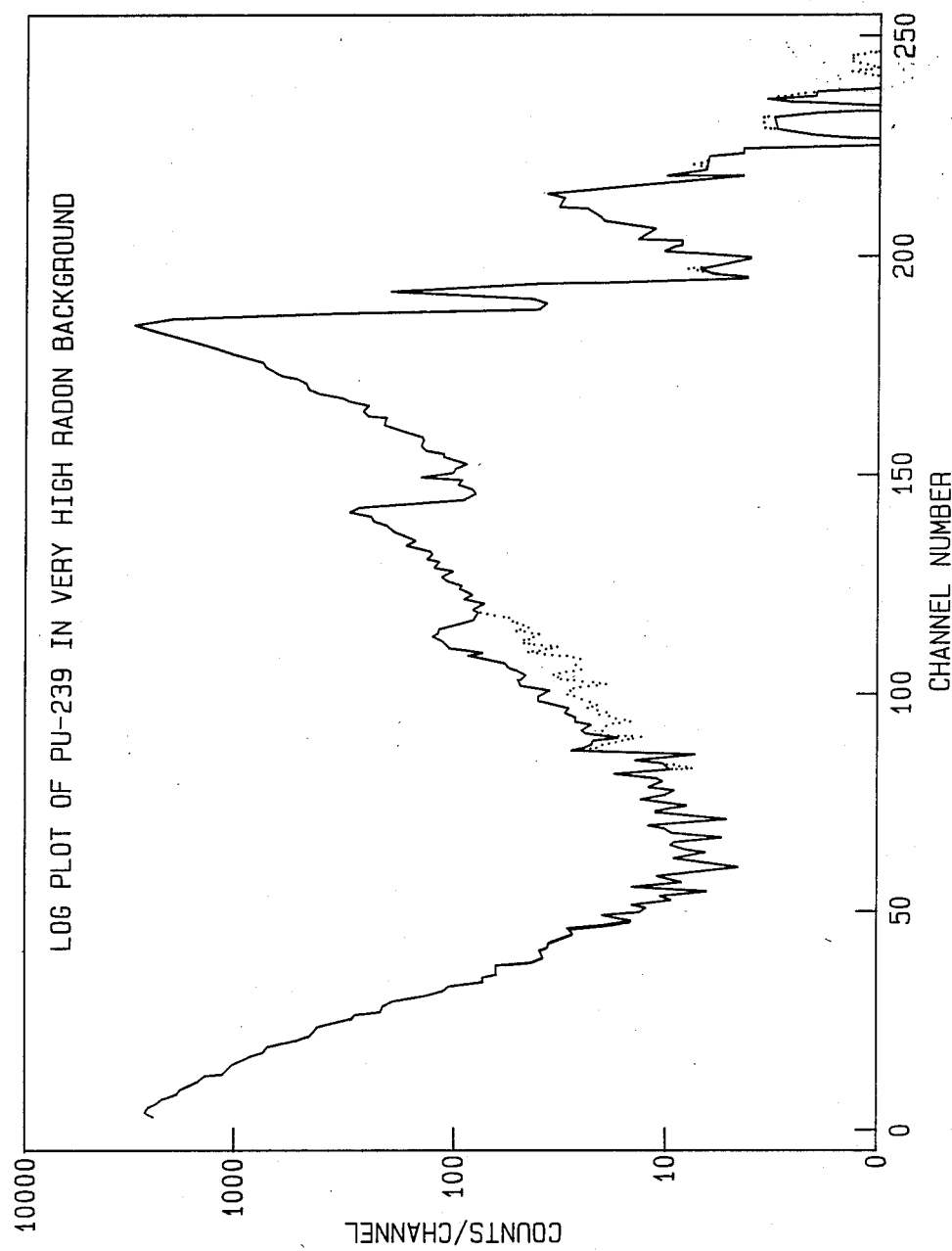
FIG. 6 is a superposition of a logrithmic Pu-239 energy spectrum on a radon/thoron spectrum.

FIG. 6 superimposes the plutonium peak 54 on the same logrithmic plot. The plutonium peak 54 illustrated here represents about 100DAC-h, with the Pu above the radon background in this case. Prior art monitors typically could not see this amount of plutonium in a background as high as that depicted, because the alarm level would have been set at a relatively high level to avoid false alarms.

The subject invention is most useful in the instance depicted in FIG. 6 when the radon background in high. Starting just above the Pu-239 upper energy edge, the computer calculates an average of the three channel counts just above the Pu-239 peak. Then the computer generates a stripping function, where each successively lower channel count is a constant fraction of the count in the channel immediately higher. The first trial stripping function assumes that the constant fraction will lie halfway between the lower and upper limits of 0.7 and 1.0, or (0.7+1.0)/2. The derived count at channel 80 is compared to the average of the actual counts observed in channels 79+80+81, and if the derived count does not match the observed average count, successive tries are made using the computer method termed a binary search until the derived count does match the observed average. When this match is obtained, this stripping function is subtracted channel by channel from the observed energy spectrum in the Pu-239 region. Thus, the stripping function forms a gradual tail extending down to channel 80, below the major portion of a Pu-239 peak if such is present.

The computer does this fitting in approximately two seconds, even if it must search for the appropriate fractional decrease several times before matching the actual count at the lower energy position. The net count after stripping the extrapolated background curve is termed the excess plutonium counts.

At the same time an algorithm is used (based on the sum of the RaC' and ThC' counts) to strip out the radon daughter contribution to the actual beta counts. This algorithm is based on the average ratio of radon daughter beta counts to radon daughter alpha counts. The difference is termed the excess beta counts.

Figure 7:
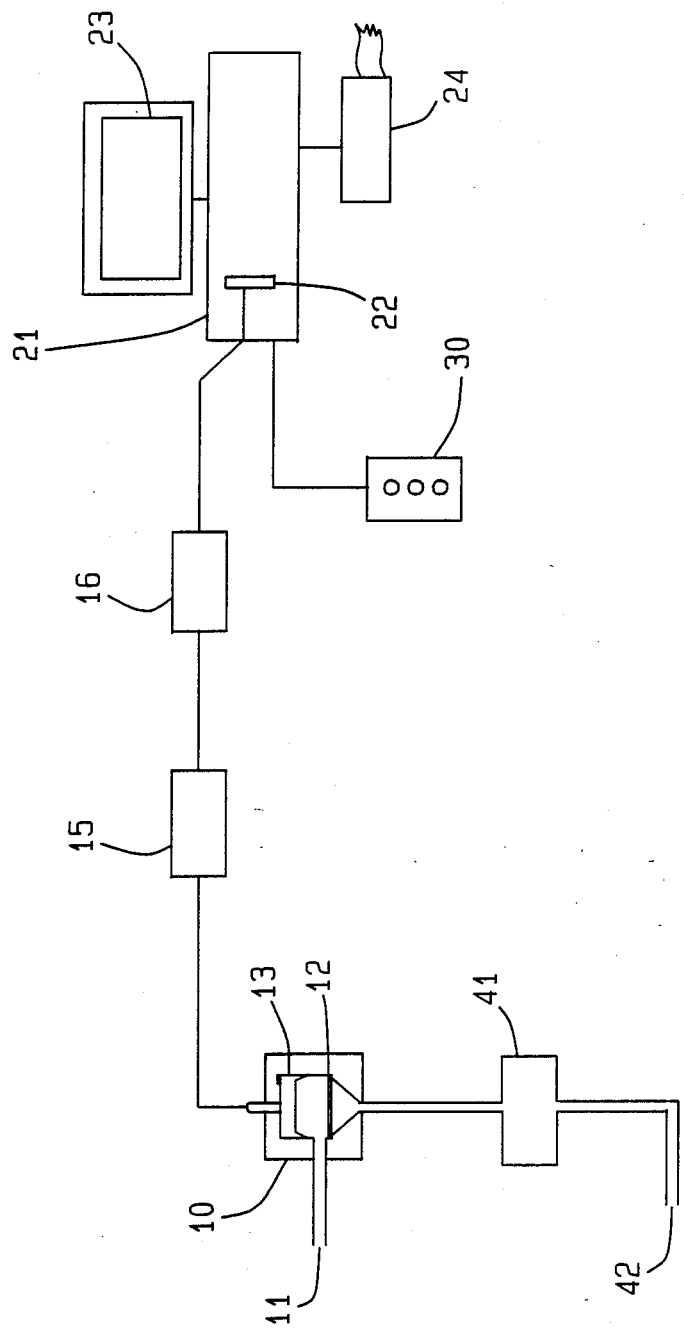
FIG. 7 is a schematic of the apparatus of the improved beta/alpha monitor.

FIG. 7 is a schematic of the apparatus of the improved beta/alpha monitor. Sample air is conveyed by the pump 41 from the air intake 11 through the sample head 10, to the air outlet 42, at a rate of 20 liters/minute. The sample head 10 is comprised of a membrane filter 12 and a silicon detector 13. The membrane filter 12 is a 47 mm diameter 0.45 micron Millipore filter stopped down to match a 450 square mm area ruggedized diffused junction silicon detector 13. A 1,000 micron depletion depth detector 13 is used to record both beta and alpha particles. The air spacing between the filter 12 and detector 13 is 3 mm at ambient pressure.

Pulses representing the energy deposited in the deep depletion layer by both beta and alpha particles are communicated to a pre-amplifier 15 and amplifier 16, which are standard Tennelec modules in a mini-NIM bin, and thence on to a controller 21, equipped with a Nucleus multichannel analyzer board 22. A screen display 23 provides a live spectral display of the beta and alpha energy spectra.

An alarm indicator 30 controlled by the IBM PC provides red, yellow and green status lights as well as an audible alarm when a significant increase occurs in designated count rates. The alarm indicator 30 and sample head 10 may both be located remotely, in the working environment, as much as 1500 feet from the controller 21.

Figure 8:
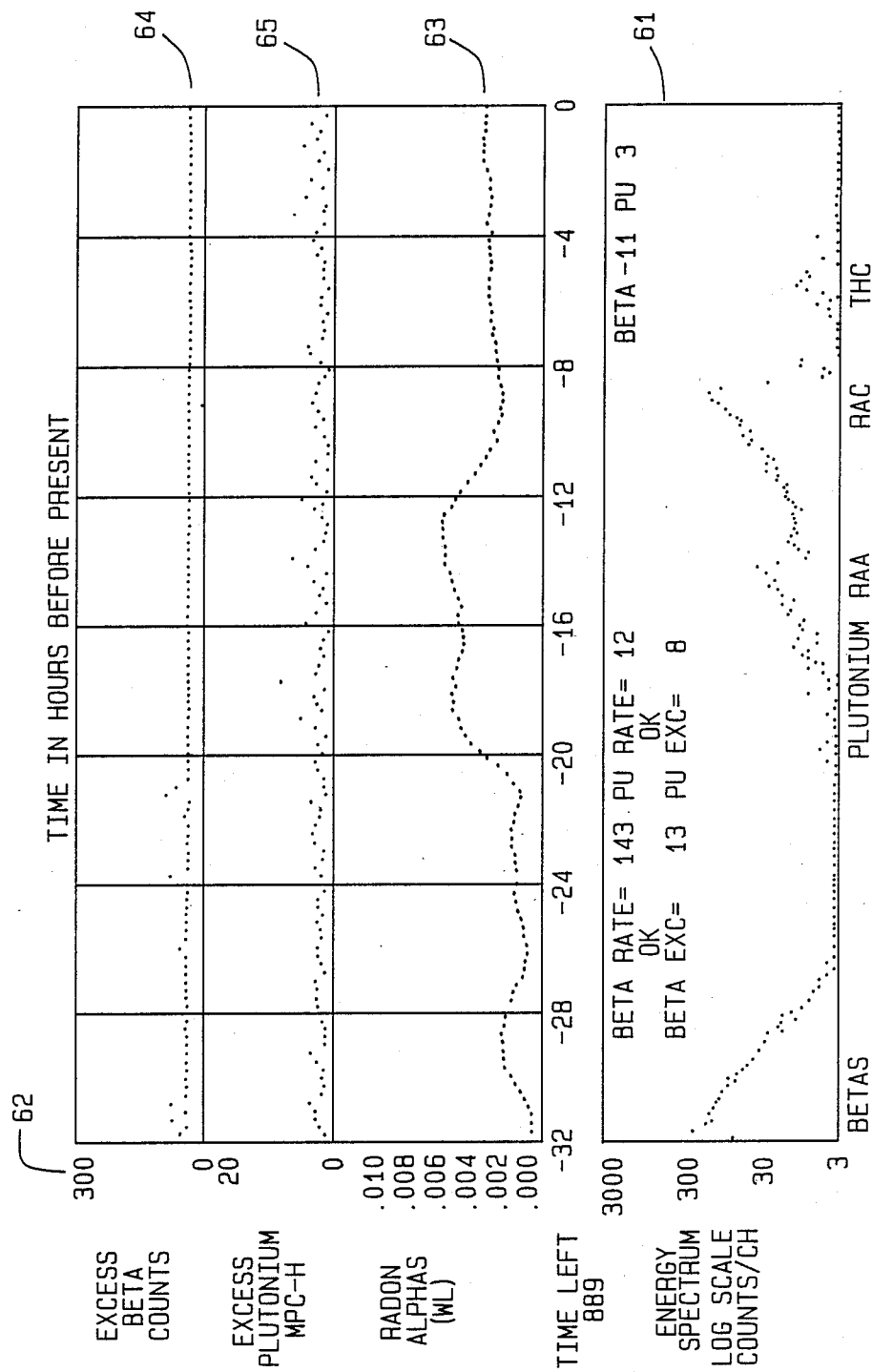
FIG. 8 is a replication of actual data on the data screen of the improved beta/alpha monitor.

Results are displayed on a three strip chart recorder display 24 and in a spectral and digital display on the PC screen 23 in FIG. 7. FIG. 8 is a replication of actual data in a screen display. The bottom display 61 is the beta and alpha energy spectrum plotted on a log scale. The energy regions are labeled on the bottom for easy identification. The apparatus updates this display continuously so it is essentially a live spectral display that is erased at the beginning of each 15 minute count. The printed information 62 just above the spectrum at the left shows the actual and excess count rate in the beta channels and in the plutonium channels. These count rates 62 are updated every 10 seconds, and the computer will trigger the alarm 30 within 10 seconds (remotely, in the working environment) if a significant increase occurs in either the excess beta or excess plutonium count rates. The status of the lights and alarm 30 are also indicated on the monitor 23, away from the working environment.

The next display just above the bottom spectrum is a time history of the radon daughter background 63 plotted in working levels. This display is updated every 15 minutes, and the chart scrolls to the left so that the previous 32 hour history is displayed continuously.

The top display is the time history of the excess beta counts 64. The next display is the time history sent the previous 32 hour history of the net counts after the stripping has been applied following each 15 minute count.

FIGS. 9a through 9j depict an exemplary listing showing the manner in which the invention was implemented for an IBM PC-XT with 20 megabyte hard disk, 640K RAM, and a PCA multichannel analyzer board. The language used is BASIC using NUCLEUS machine language subroutines. As with all computer programs, they must be written for the particular hardware and carefully debugged. FIGS. 9a through 9j depict a useful example of one implementation.

Depicted on FIGS. 9a through 9j are the elements of the method used. They are as listed in Table I following:

TABLE I

| Lines 80–150 | Sets up files for storing spectral data and parameter data, |
|---|---|
| Lines 170–760 | Nucleus PCA-1000 software parameters for operating IBM-PC as a multi-channel analyzer, |
| Lines 770–1670 | Screen graphics for display of energy spectrum (betas and alphas) and three time histories (excess betas, excess plutonium and radon daughters in working levels), |
| Lines 1680–1810 | Acquires spectral data, |
| Lines 1820–2500 | Updates screen alarms if PUCH counts or beta counts coming in at excessive rates, |
| Lines 2510–3890 | Examines 15 minute spectrum in detail, curve fits and subtracts background from PUCH channels, |
| Lines 3900–4280 | Nucleus PCA machine language software routines for controlling MCA board. |

In an alternate embodiment, the method of the subject invention uses the apparatus described and least squares exponentials and power series methods of curve fitting known to the prior art. If the radon daughter background is relatively low this method subtracts the "straggling" of the RaA peak that falls in the plutonium channels.

In another embodiment using the apparatus of the subject invention, the shape of the RaC' peak can be fitted and transferred to the RaA peak "straggling" in the plutonium channels, thereby distinguishing a low radon daughter background.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiment of the invention in which an exclusive property or privilege is claimed is defined as follows:

1. An air monitor comprised of:
   spectrographic detection means for sampling, measuring, and graphically displaying the energy levels of alpha and beta particles,
   curve fitting means for extrapolating curves depicting repeated measurements of said energy levels, and
   alarm means for signaling significant deviations from said extrapolated curves.

2. The air monitor of claim 1 wherein said spectrographic detection means includes a single semiconductor detector for both alpha and beta particle detection.

3. The air monitor of claim 2 wherein said semiconductor detector head is a 1,000 micron diffused junction detector.

4. The air monitor of claim 1 wherein said curve fitting means identifies and distinguishes energy levels attributable to the presence of radon and thoron daughters.

5. The air monitor of claim 2 wherein said curve fitting means identifies and distinguishes energy levels attributable to beta background.

6. The air monitor of claim 1 wherein said alarm means signals the presence of plutonium beyond legally permissible concentrations.

7. A semiconductor air monitor comprising:
   single detection means, for simultaneously converting to pulses the energy levels of both alpha and beta particles, and
   discrimination means, for identifying and distinguishing among said pulses those attributable to the presence of natural radon and thoron daughters and those attributable to the presence of plutonium.

8. The air monitor of claim 7 further comprising discrimination means for identifying and distinguishing among said pulses those attributable to the presence of natural beta background.

9. The air monitor of claim 8 wherein said detection means is a 1,000 micron diffused junction silicon detector.

10. The air monitor of claim 9 wherein said discrimination means is a microcomputer equipped with a multichannel analyzer board.

11. The air monitor of claim 10 wherein said microcomputer uses spectral analysis to discriminate among the energy levels of said alpha and beta particles.

* * * * *